United States Patent [19]
Hazen

[11] Patent Number: 4,658,507
[45] Date of Patent: Apr. 21, 1987

[54] SAFETY DEVICE FOR POWER DRIVEN CHAIN SAWS

[76] Inventor: Albert A. Hazen, 4332 Greensboro, Troy, Mich. 48098

[21] Appl. No.: 690,202

[22] Filed: Jan. 10, 1985

[51] Int. Cl.[4] .............................................. B23D 57/02
[52] U.S. Cl. .......................................... 30/382; 30/295
[58] Field of Search ................. 30/382, 383, 381, 286, 30/384, 385, 386, 387, 295; 173/170

[56] References Cited

U.S. PATENT DOCUMENTS

| | | | |
|---|---|---|---|
| 2,348,612 | 5/1944 | Deacon | 30/382 |
| 3,781,988 | 1/1974 | Jones | 30/286 X |
| 4,365,416 | 12/1982 | Overbury | 30/382 |
| 4,447,953 | 5/1984 | Lombardino et al. | 30/382 |

*Primary Examiner*—E. R. Kazenske
*Assistant Examiner*—Willmon Fridie, Jr.
*Attorney, Agent, or Firm*—Remy J. VanOphem

[57] ABSTRACT

An improved chain saw of the power driven type adapted to be held by an operator using two hands, as well as a wrist support for a chain saw. The improved chain saw has a housing including a first and second handle. A cutting chain apparatus extends from the housing. At least one wrist support is fixedly interconnected with the housing at a predetermined location thereon between one handle of the first and second handles and the cutting chain apparatus, such that, when the operator grips the one handle with one hand, during a kickback condition the wrist support prevents inadvertent rotation of the wrist associated with the one hand.

10 Claims, 5 Drawing Figures

SAFETY DEVICE FOR POWER DRIVEN CHAIN SAWS

BACKGROUND OF THE INVENTION

The present invention relates to a safety device for power driven chain saws and more particularly to a safety device for preventing sudden inadvertent rotation of the power driven chain saw which might otherwise displace the cutting chain assembly from the workpiece being cut in a direction towards the operator of the power driven chain saw.

Compact and portable power driven chain saws have become extremely popular in recent years for various cutting purposes, particularly when an extremely large workpiece, such as a tree trunk, is to be cut. The power driven chain saws are typically used outdoors in varying weather conditions. Furthermore, the power driven chain saws are typically used to cut workpieces which are so bulky as to render it impractical or impossible to cut such workpieces using a manual tool or a table saw. Typically the workpiece is self-supported and, accordingly, may move in an uncontrollable and in an unpredictable manner as the cutting process progresses. The conditions inherent in the typical uses of a power driven chain saw result in situations which are prone to result in various types of accidents which cause damage to the workpiece or the chain saw, or cause injury to the operator. Furthermore, the very portability which makes the power driven chain saw an attractive cutting tool contributes to careless and inattentive use of the device, which further contributes to accidents.

The need for safety devices in conjunction with power driven chain saws is well recognized in the art. Various methods and apparatuses have been described in previous patents and have been included in power driven chain saws currently commercially available. Such safety devices approach the safety hazards associated with power driven chain saws by shielding the cutting chain or by providing redundant controls or various braking devices to instantaneously stop the operation of the cutting chain assembly.

One of the most common safety devices offered for power driven chain saws is a cutting chain guard to shield all or part of the cutting chain assembly so as to avoid injury to the operator. Such cutting chain guards include removable guards disclosed, for example, in U.S. Pat. No. 2,826,294, issued Mar. 11, 1958, to Nicodemus. While such cutting chain guards protect the operator to varying degrees, they tend to interfere with the operation of the chain saw for some purposes. Furthermore, in order to accommodate the operation of the chain saw for these purposes, the cutting chain guard may be removed from the power driven chain saw, thereby defeating its safety purpose. Furthermore, because of the inconvenience involved in removing and reinstalling cutting chain guards to accommodate varying circumstances, it is not uncommon for a cutting chain guard, once removed, to remain permanently removed from the power driven chain saw.

Another approach that has been taken in the past to provide some protection to the operator, the workpiece, and the power driven chain saw during a kickback condition is to provide an inertia actuated safety brake, which responds to a sudden acceleration or rotation of the power driven chain saw by disengaging the motor of the power driven chain saw and/or engaging a brake to stop the cutting chain assembly from moving. An example of a power driven chain saw using an inertia actuated safety device is disclosed, for example, in U.S. Pat. No. 3,485,326, issued Dec. 23, 1969, to Wilkin.

Still another approach taken to reduce the dangers associated with kickback of power driven chain saws is to provide a brake lever adjacent the one of the two handles of the power driven chain saw which is closer to the cutting chain assembly. The brake lever is selectively pivotable between a position adjacent the handle and a position adjacent the cutting chain assembly. A brake for stopping the motion of the cutting chain assembly is actuated when the brake lever is disposed in the latter position. In operation, a power driven chain saw with a brake lever is typically held by both hands of an operator, one of the hands engaging the handle adjacent the brake lever. During a kickback condition, the one hand adjacent the brake lever pivots the brake lever to stop the motion of the cutting chain assembly. An example of such a device is disclosed, for example, in U.S. Pat. No. 3,664,390, issued May 23, 1972, to Mattsson. While such a safety device does, in many cases, effectively stop the cutting motion of the cutting chain assembly in the event that the power driven chain saw is held properly, no provision is made in any of these devices for arresting the rotational motion of the power driven chain saw away from the workpiece. Furthermore, no provision is made to ensure that the power driven chain saw is, in fact, held properly so as to assure that the brake lever will, in fact, be actuated in the event of a kickback condition.

Finally, in U.S. Pat. No. 3,361,165, issued Jan. 2, 1968, to Irgens, a power driven chain saw is disclosed which is adapted to be held by an operator using two hands wherein two controls are provided, one associated with each hand, to assure that the power driven chain saw was held properly by both hands. A switch associated with one hand is a finger trigger switch operable to control the throttle. The handle associated with the other hand is itself a control. The handle is pivotally mounted to the housing of the power driven chain saw so as to be pivotable to selectively engage a clutch which is mechanically interposed between the motor of the power driven chain saw and the cutting chain assembly thereof. Thus, both controls are required to be in an operative position in order to obtain a cutting action by the cutting chain assembly. However, no provision is made in Irgens for preventing inadvertent rotation of the power driven chain saw as a result of kickback, or for braking the momentum of the cutting chain assembly, once it is set in motion.

The amount of torsional force required to stop the inadvertent rotation of a power driven chain saw during a kickback condition is typically very small. Nonetheless, even where one of the various above described prior art safety devices are provided to decelerate or brake the cutting chain assembly, it is still possible for the operator, the workpiece, or the power driven chain saw itself to be damaged. Accordingly, what is needed is a safety device for a power driven chain saw, and a power driven chain saw incorporating such a safety device wherein inadvertent rotation of the cutting chain of the power driven chain saw away from a workpiece and towards the operator is directly inhibited.

SUMMARY OF THE PRESENT INVENTION

The present invention provides an inexpensive, lightweight, and removable device for inhibiting improper operation of a power driven chain saw and for inhibiting inadvertent rotation of the cutting assembly of a power driven chain saw away from a workpiece towards the operator during a kickback condition.

In particular, the present invention provides a power driven chain saw of the type adapted to held by an operator using two hands, the chain saw having a housing, a cutting chain assembly extending from the housing, and first and second handles for respective gripping by the hands of the operator. A first wrist support plate is fixedly interconnected with the housing at a first predetermined location thereon between the first handle and the cutting chain assembly. The first wrist support plate extends from the first predetermined location in a direction generally away from the cutting chain assembly such that when the power driven chain saw is held by an operator and the operator grips the first handle by a first hand, the first wrist support plate cooperates with the arm and wrist associated with the first hand of the operator to prevent inadvertent rotation of the wrist and, therefore, to prevent inadvertent rotation of the power driven chain saw during a kickback condition.

Preferably, a second wrist support plate is fixedly interconnected with the housing at a second predetermined location thereof between the second handle and the cutting chain assembly, the second wrist support plate extending from the second predetermined location in a direction generally away from the cutting chain assembly. When the power driven chain saw is held by an operator and the operator grips the second handle by a second hand, the arm and wrist associated with the second hand of the operator cooperate with the second wrist support plate to inhibit inadvertent rotation of the second wrist.

In the preferred embodiment, each of the first and second handles are provided with a switch actuated by the first and second hands, respectively, such that operation of the cuttiing chain assembly is only available when both of the first and second switches are operated.

It is a primary object of the present invention to provide a power driven chain saw having wrist support plates to prevent inadvertent rotation of the power driven chain saw during a kickback condition.

Another object of the present invention is to provide a wrist support plate for removable interconnection with a power driven chain saw, such as to prevent such inadvertent rotation of the power driven chain saw.

Yet another object of the present invention is to provide a power driven chain saw and a safety device therefor wherein the power driven chain saw may only be operated when the two hands of the operator grip two handles of the power driven chain saw in a proper manner.

These and the many other objects, features, and advantages of the present invention will become apparent to those skilled in the art when the following detailed description is read in conjunction with the drawings appended hereto.

BRIEF DESCRIPTION OF THE DRAWINGS

In the drawings appended hereto, wherein like reference numerals refer to like components throughout.

DETAILED DESCRIPTION OF THE PREFERRED EMBODIMENT

Figure 1:
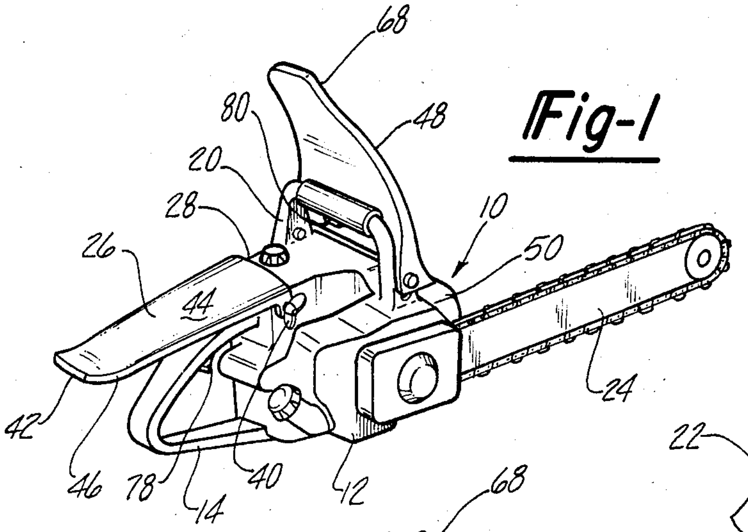
FIG. 1 is a perspective view of an example of a power driven chain saw incorporating a rearward wrist support plate and a forward wrist support plate according to the present invention.
Figure 2:
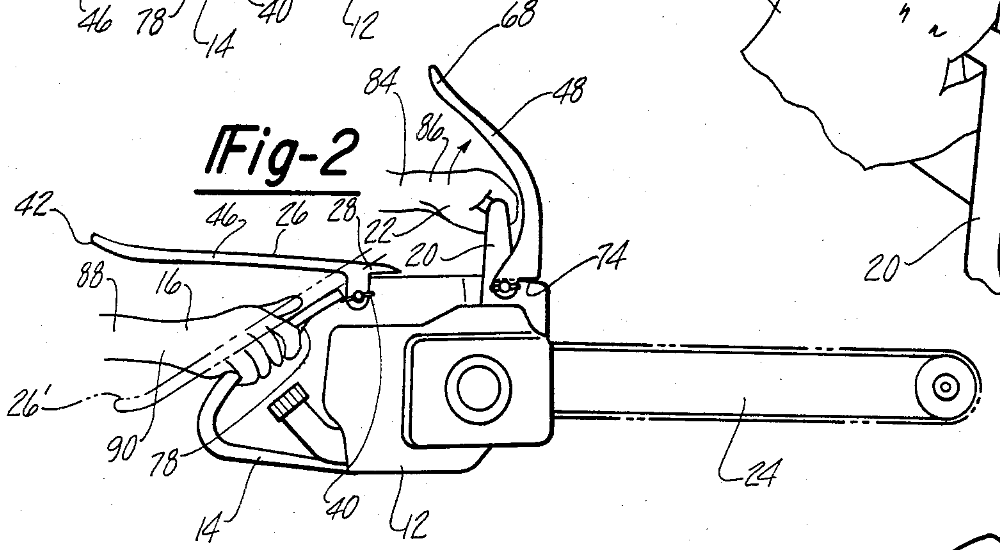
FIG. 2 is a side elevational view thereof showing the improved power driven chain saw gripped by two hands of an operator.

Referring now to the drawings and more particularly to FIGS. 1 and 2 thereof, a power driven chain saw 10 according to the present invention is illustrated. The power driven chain saw 10 has a housing 12 encompassing a motor, well known in the art but not illustrated in the drawing, which may be an internal combustion engine or an electric motor. A rearward handle 14 extends rearwardly of the housing 12 for gripping by one hand, for example the right hand 16, of the operator of the power driven chain saw 10. A forward handle 20 extends upwardly from a central portion of the housing 12 for gripping by a hand, for example the left hand 22, of the operator of the power driven chain saw 10. A cutting chain assembly 24 extends forwardly of the housing 12 and is driven, in a known manner, by the motor, not shown, of the power driven chain saw 10.

Figure 5:
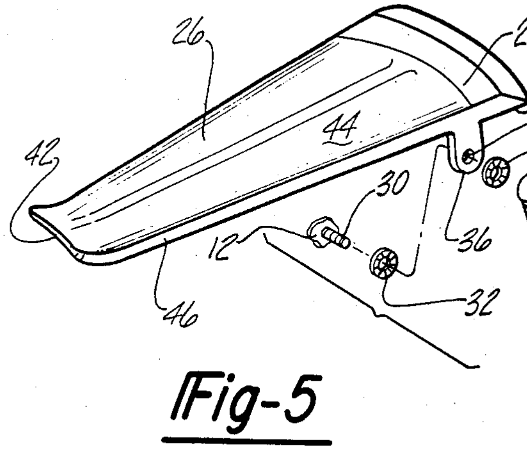
FIG. 5 is a partial exploded perspective view of the rearward wrist support plate and the housing of the power driven chain saw of FIG. 1 as well as the mounting hardware associated therewith.

As shown in FIGS. 1, 2 and 5, a rearward wrist support plate 26 is removably and pivotally interconnected with the housing 12 of the power driven chain saw 10 at a location intermediate the forward handle 20 and the rearward handle 14. In particular, as best shown in FIG. 5, a first end 28 of the rearward wrist support plate 26 is pivotally mounted to the housing 12 by way of a pair of threaded studs 30, only one of which is shown in the drawing, extending progressively through a washer 32, an aperture 34 in a flange 36 extending from the rearward wrist support plate 26, a washer 38, and a wing nut 40. The rearward wrist support plate 26 extends rearwardly from the first end 28 to a second end 42 disposed above the rearward handle 14. The first end 28 extends from the flange 36 to form a tab 47.

As shown in FIG. 2, the rearward wrist support plate 26 is pivotable from a first position, shown in solid line, disposed a predetermined angular distance away from the rearward handle 14. Alternatively, and as shown in dotted line and indicated by reference numeral 26' in FIG. 2, the rearward wrist support plate may be pivoted downwardly against the rearward handle 14 for storage. The wing nuts 40, only one of which is shown in the drawing, permit the operator to selectively fixedly interconnect the rearward wrist support plate 26 with the housing 12 in either of the extreme angular positions illustrated in FIG. 2 or at any intermediate angular position therebetween, as needed. The tab 47 prevents the rearward wrist support plate from advancing upwardly from the first position, as shown in solid line in FIG. 2.

In the preferred embodiment, the rearward wrist support plate 26 has an elongated arcuate top portion 44 and a perimetric lip 46 extending downwardly from the edges of the elongated arcuate top portion 44 to provide a rigid and attractive structure. The second end 42 is curved upwardly to present a smooth surface for contact with an arm 88 or a wrist 90 of the operator.

Figure 4:
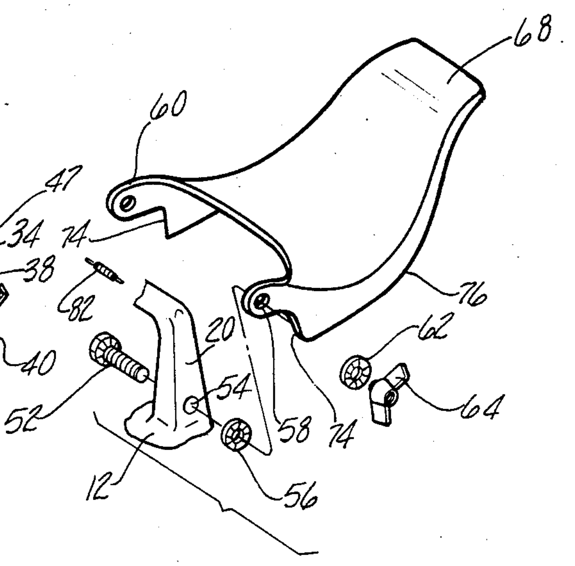
FIG. 4 is a partial exploded perspective view of the forward handle and the forward wrist support plate, as well as the hardware associated therewith.

The power driven chain saw 10 of the present invention also includes a forward wrist support plate 48 disposed between the forward handle 20 and the cutting chain assembly 24, as best shown in FIGS. 1 and 2. The forward wrist support plate 48 has a first end 50 pivotally mounted to the forward handle 20, as best shown in FIG. 4, by means of a pair of bolts 52, only one of which is shown in the drawing. Each of the bolts 52 is passed progressively through an aperture 54 in the forward handle 20, a washer 56, an aperture 58 and a flange 60 extending from the first end 50 of the forward wrist support plate 48, and a washer 62 and is threaded into a wing nut 64. The forward wrist support plate 48 extends radially from the pivoting axis defined by the bolts 52 from the first end 50 towards a second end 68 disposed a predetermined distance away from the forward handle 20. The forward wrist support plate 48 has a flat top portion 70 and a perimetric flange 72 extending angularly from the flat top portion 70 in a first predetermined direction to form a perimetric rib 76 providing rigidity to the forward wrist support plate 48.

Figure 3:
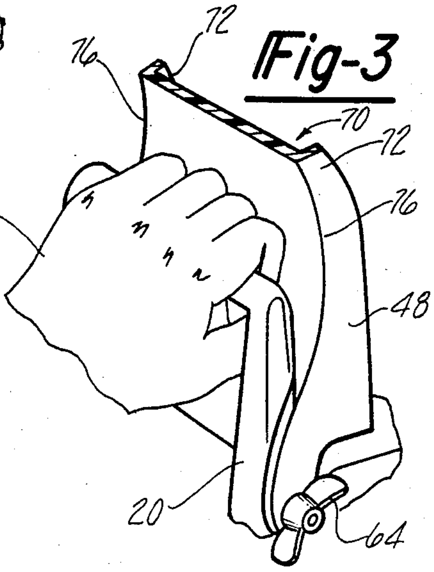
FIG. 3 is an enlarged partial cutaway perspective view of a forward handle and the forward wrist support plate of the power driven chain saw of FIG. 1.

The forward wrist support plate 48 is pivotable about the axis defined by the bolts 52 from a predetermined raised operating position shown in solid line in FIGS. 1, 2, and 3. Alternatively, the forward wrist support plate 48 is pivotable to a lowered position adjacent the cutting chain assembly 24 for purposes of storing the power driven chain saw 10. The forward wrist support plate 48 is selectively fixedly interconnected with the housing 12 in either the raised or the lowered position, or any position therebetween, by tightening of the wing nuts 64. A stop surface 74 is formed at the end of the perimetric flange to stop the forward wrist support plate 48 at the predetermined raised operating position and prevent movement of the forward wrist support plate in a direction toward the cutting chain assembly 24.

The power driven chain saw 10 of the present invention is provided with one or more control switches to operate the motor, not illustrated, to interconnect the motor with the cutting chain assembly 24, such as to drive the cutting chain assembly, and/or to disengage a brake, not shown in the drawing but well known in the art, for stopping the operation of the cutting chain assembly.

In some power driven chain saws of the prior art, only a primary control switch 78 is provided adjacent the rearward handle 14, such as to assure that at least one hand of the operator is properly gripping the rearward handle 14 before the cutting chain assembly 24 is operated. While the rearward wrist support plate 26 and the forward wrist support plate 48 may be used advantageously according to the present invention with such a power driven chain saw, in the preferred embodiment, and as shown in the drawing, the power driven chain saw 10 is provided with a secondary control switch 80 mounted to the forward handle 20. The secondary control switch 80 may be interconnected, as is well known in the art, by suitable interconnection means 82, such as a sheated cable or an l the throttle while the secondary control switch 80 may be selectively operated to engage the clutch between the motor and the cutting chain assembly 24 in a manner similar to Irgens, supra. Alternatively, and not illustrated in the drawing, theoperly engaging the rearward handle 14 and the forward handle 20. The use of two control switches is preferred since it helps to assure that the power driven chain saw 10 is held properly by both hands, thereby reducing the likelihood of kickback and further assuring that the rearward and forward wrist support plates 26 and 48 function properly in the event of a kickback condition.

In operation, the rearward and forward wrist support plates 26 and 48, respectively, are secured by the wing nuts 40 and 64, respectively, in their related positions as shown in solid line in FIGS. 1 and 2. The operator of the power driven chain saw 10 grips each of the rearward and forward handles 14 and 20 of the power driven chain saw 10 with the hands 16 and 22 and, by operation of the primary control switch 78 and the secondary control switch 80, operates the cutting chain assembly 24. In the event that the cutting chain assembly 24 encounters a force causing a kickback condition, the cutting chain assembly 24 will begin to pivot upwardly which, in the absence of the forward and rearward wrist support plates 48 and 26, would create a risk of damage to the workpiece and the cutting edges of the cutting chain assembly 24, as well as a risk of injury to the operator. However, the pivoting motion of the power driven chain saw 10 will be limited, such as to minimize the risks associated with a kickback condition, by the operation of the rearward wrist support plate 26 and the forward wirst support plate 48. As best shown in FIG. 2, during such kickback condition, the second end 42 of the rearward wrist support plate 26 abuts a portion of the arm 88 extending from the right hand 16 of the operator, thereby limiting the rotation of the wrist 90 associated with the right hand 16. Similarly, the second end 68 of the forward wrist support plate 48 encounters a portion of the arm 84 associated with the left hand 22 of the operator, such as to limit the rotation of the wrist 86 associated therewith. Thus, the operator will maintain control of the power driven chain saw 10. If the force experienced by the operator during a kickback condition is substantial, the operator will be compelled to release one or both of the primary and secondary control switches 78 and 80, such that operation of the cutting chain assembly 24 will cease.

It is within the contemplation of the present invention that, for some purposes, only one of the rearward wrist support plate 26 and the forward wrist support plate 48 would be used. Furthermore, while the rearward wrist support plate 26 and the forward wrist support plate 48 are shown having different shapes, for purposes of illustration, it is within the contemplation of the present invention that the forward and rearward wrist support plates be identically shaped. The forward and rearward wrist support plates 48 and 26, respectively, may be factory installed to a power driven chain saw by any appropriate means, in a permanent manner such as to reduce the likelihood of the operator removing the wrist support plates from the power driven chain saw 10. Alternatively, the forward and rearward wrist support plates 48 and 26 may be added to any existing power driven chain saw 10 by appropriate interconnection means. Finally, the forward and rearward wrist support plates 48 and 26 may be formed by any appropriate method and from any appropriate material, including plastic and metal.

It will be appreciated by those skilled in the art that many variations and modifications may be made from the above described example of structure for a power driven chain saw 10 and a rearward and forward wrist support plate 26 and 48, without departing from the spirit of the present invention. Such modifications and variations are included within the intended scope of the claims appended hereto.

What is claimed is as follows:

1. An improved chain saw of the power driven type adapted to be held by an operator using two hands, said improved chain saw having a housing means and a cutting chain means extending from said housing means, said housing means further including a first handle means disposed remote from said cutting chain means and a second handle means disposed between said first handle means and said cutting chain means wherein said improvement comprises:

first wrist support means fixedly interconnected with said housing means at a first predetermined location thereon between said first handle means and said second handle means, said first wrist support means extending from said first predetermined location in a direction generally away from said cutting chain means such that, when said improved chain saw is held by an operator, and the operator grips said first handle means by a first hand interconnected with a first arm by a first wrist, said first wrist support means cooperates with the first arm of the operator to inhibit inadvertent rotation of the first wrist; and a second wrist support means fixedly interconnected with said housing means at a second predetermined location thereon between said second handle means and said cutting chain means, said second wrist support means extending from said second predetermined location in a direction generally away from said cutting chain means and beyond said second handle means such that when said improved chain saw is held by an operator and the operator grips said second handle means by a second hand interconnected with a second arm by a second wrist, said second wrist support means cooperates with the second arm of the operator to inhibit inadvertent rotation of the second wrist.

2. The improved chain saw of claim 1 wherein said cutting chain means has a longitudinally extending axis and wherein said improvement further comprises:

first pivotal interconnection means mechanically interposed said first support means and said housing means such that said first wrist support means is pivotable along said longitudinally extending axis of said cutting chain means between a first position adjacent said housing means for storage of said improved chain saw and a second position pivoted away from said housing means for use in cooperation with the first arm of the operator;

first stopping means operable for stopping said first wrist support means from pivoting upwardly from said housing means beyond said second position;

second pivotal interconnection means mechanically interposed said second wrist support means and said housing means such that said second wirst support means is pivotable between a third position adjacent said housing means for storage of said improved chain saw and a fourth position pivoted away from said housing means for use in cooperation with the second arm of the operator; and second stopping means operable for stopping said second wrist support means from pivoting away from said housing means beyond said fourth position thereof.

3. The improved chain saw of claim 1 further comprising:

first control means disposed adjacent said first handle means; and second control means disposed adjacent said first handle means, said cutting chain means being operable only when said first and second control means are operated by the first and second hands of the operator.

4. The improved chain saw of claim 1 wherein each of said first and second wrist support means is arcuate in cross-section such as to wrap partially about the first and second arms, respectively, of the operator when said improved chain saw is in use.

5. The improved chain saw of claim 1 wherein said first wrist support means is adjustably interconnected with said housing means.

6. The improved chain saw of claim 1 wherein said first wrist support means is removably interconnected with said housing means.

7. The improved chain saw of claim 1 wherein said first wrist support means is interconnected with said first handle means.

8. The improved chain saw of claim 1 wherein said first wrist support means is a sheet metal stamping.

9. The improved chain saw of claim 1 wherein said first wrist support means is a plastic molding.

10. The improved chain saw of claim 1 wherein said cutting chain means has a longitudinally extending axis and wherein said improvement further comprises:

pivotal interconnection means mechanically interposed said first wrist support means and said housing means such that said first wrist support means is pivotable along said longitudinally extending axis of said cutting chain means between a first position for use in cooperation with the first arm of the operator and a second position for storage of said improved chain saw; and locking means operable for selectively locking said first wrist support means in said first position.

* * * * *